United States Patent
Hajaj et al.

(10) Patent No.: US 8,949,228 B2
(45) Date of Patent: Feb. 3, 2015

(54) IDENTIFICATION OF NEW SOURCES FOR TOPICS

(71) Applicant: Google Inc., Mountain View, CA (US)

(72) Inventors: Nissan Hajaj, Emerald Hills, CA (US); Garrett Yaun, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 191 days.

(21) Appl. No.: 13/742,109

(22) Filed: Jan. 15, 2013

(65) Prior Publication Data

US 2014/0201199 A1    Jul. 17, 2014

(51) Int. Cl.
G06F 17/30        (2006.01)

(52) U.S. Cl.
CPC .................... *G06F 17/30867* (2013.01)
USPC ............................................. 707/723

(58) Field of Classification Search
USPC ............................................. 707/723
See application file for complete search history.

(56) References Cited

U.S. PATENT DOCUMENTS

| | | | |
|---|---|---|---|
| 7,502,770 B2 | 3/2009 | Hillis et al. | |
| 8,595,250 B1 * | 11/2013 | Egnor et al. | 707/758 |
| 8,639,690 B2 * | 1/2014 | Dean et al. | 707/725 |
| 2008/0201348 A1 * | 8/2008 | Edmonds et al. | 707/101 |
| 2012/0278341 A1 * | 11/2012 | ogilvy et al. | 707/749 |
| 2013/0214304 A1 * | 8/2013 | Kim et al. | 257/89 |

OTHER PUBLICATIONS

Elkan, C., "Text mining and topic models", University of California, San Diego, Department of Computer Science and Engineering, Feb. 15, 2012, 24 pages.
Wallach, H.M., "Topic Modeling: Beyond Bag-of-Words", Cavendish Laboratory, University of Cambridge, Cambridge, United Kingdom, Jun. 26, 2006, 40 pages.

* cited by examiner

*Primary Examiner* — Debbie Le
(74) *Attorney, Agent, or Firm* — Fish & Richardson P.C.

(57) ABSTRACT

Methods, systems, and apparatus, including computer programs encoded on computer storage media, for collecting user interaction data of a plurality of users for each of a first plurality of document-text pairs, wherein the user interaction data is collected for the document-text pair from a respective service for which the respective text of the document-text pair was selected. A respective weight is calculated for each of the first plurality of document-text pairs based on, at least, the collected user interaction data for the document-text pair. One or more topics are associated with one or more of the sources based on, at least, the respective weights associated with a plurality of first document-text pairs that are associated with the source.

19 Claims, 4 Drawing Sheets

IDENTIFICATION OF NEW SOURCES FOR TOPICS

BACKGROUND

The present disclosure relates to, among other things, identification of sources for high quality information about particular topics.

Internet search engines aim to identify resources (e.g., web pages, images, text documents, multimedia content) that are relevant to a user's needs and to present information about the resources in a manner that is most useful to the user. Internet search engines return a set of search results in response to a user submitted query. Internet-based social networking services provide a digital medium for users to interact with one another and share information. For example, users are able to distribute content (e.g., textual comments, digital images, digital videos, digital audio, hyperlinks to websites, etc.) to other users that they might be connected with in the social networking service. Content that is distributed to a user can be displayed to the user in a stream page.

SUMMARY

The interaction of users with documents published by sources is analyzed over time to determine what sources produce high-quality documents for what topics based on user interaction data collected for those documents. Once a source's topics are identified, new documents published by the source pertaining to the same topics can be assumed to be of high quality even though there may be little or no user interaction data collected for the new documents.

In general, one aspect of the subject matter described in this specification can be embodied in methods that include the actions of associating a respective text with each of a plurality of documents wherein the respective text was selected based on, at least, a respective service through which the document was identified, and wherein the document and the respective text form a document-text pair; collecting user interaction data of a plurality of users for each of a first plurality of the document-text pairs, wherein the user interaction data is collected for the document-text pair from a respective service for which the respective text of the document-text pair is selected; calculating a respective weight for each of the first plurality of document-text pairs based on, at least, the collected user interaction data for the document-text pair; and associating one or more topics with a source based on, at least, the respective weights associated with a plurality of first document-text pairs that associated respective documents that were published by the source. Other embodiments of this aspect include corresponding systems, apparatus, and computer programs.

These and other aspects can optionally include one or more of the following features. The source is an author or location on a network from which content can be obtained. The respective text of a particular document-text pair is a query for which one or more search results responsive to the query identified the particular document of the document-text pair. The collected user interaction data for the particular document-text pair is selections of the search results. The respective text of a particular document-text pair is one or more terms from the respective document of the document-text pair. The collected user interaction data for the particular document text pair is selections of social network posts, electronic email, or news feed posts that identify the particular document of the particular document-text pair. The one or more terms are high inverse document frequency or high term frequency and inverse document frequency terms in the respective document of the particular document-text pair. Each respective service is a search engine, a social network, electronic mail system, or a news feed system. Each topic refers to a person, a place, a thing, or a concept.

These and other aspects can realize one or more of the following advantages. The topics for which a give source publishes high quality content are determined in various implementations as will be explained below. Knowing which sources are best for given topics can be used to customize content delivery to users based on their interests, for example. Additionally, documents that pertain to topics that align with those of the sources from whence they were published can be boosted in rankings of search results and news feeds when users are seeking content regarding those topics.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process for identifying one or more topics that a given source produces high quality content for.

Like reference numbers and designations in the various drawings indicate like elements.

DETAILED DESCRIPTION

Figure 1:
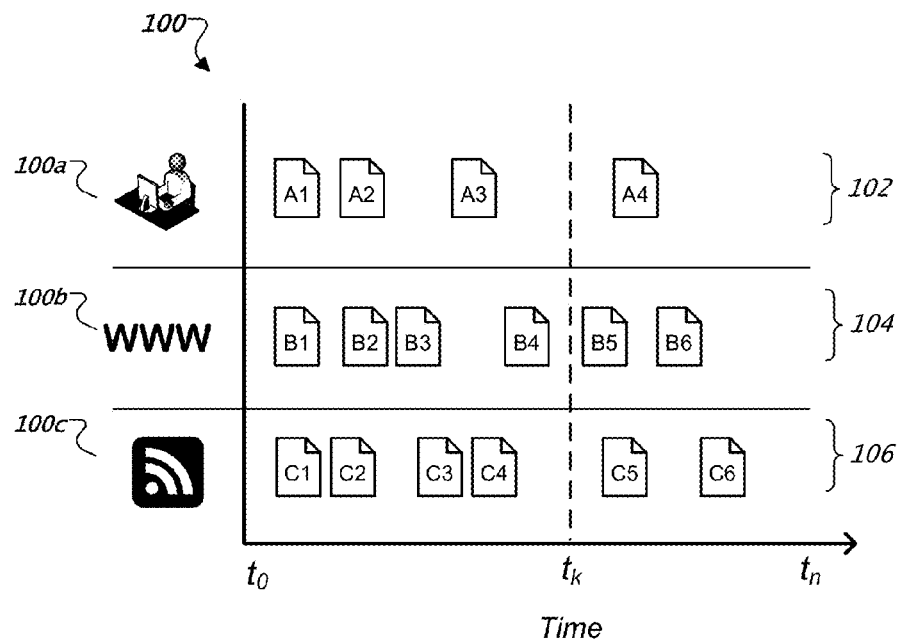
FIG. 1 illustrates example sources of documents and topics determined for the sources.
Figure 1:
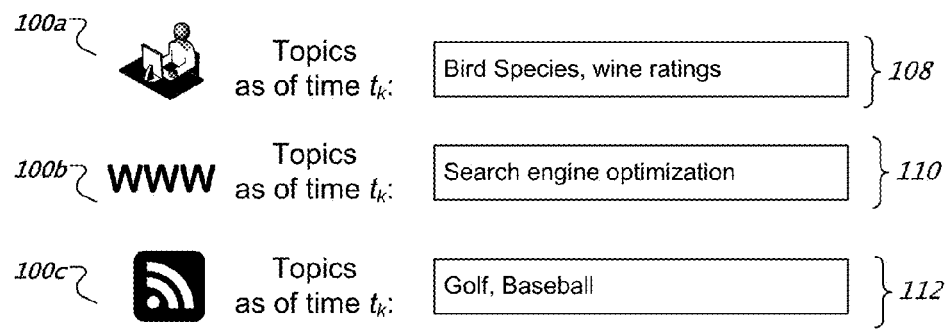

FIG. 1 illustrates example sources of documents and topics determined for the sources. In various implementations, the topics for which a given source publishes high quality content are determined based on user interaction with documents published by the source. A source is an author of content, a location on the Internet or other network from which content can be obtained, or both. For example, a source can be the name of an author (source 100a), the uniform resource locator (URL) of a news feed (source 100c), the URL of a video or audio stream, a domain name, the URL of a newspaper's web page (source 100b), an electronic mail (email) address, or the URL of a particular article published on the newspaper's website. By way of a further example, a source can be a user of a social network who authors posts for distribution in the news feed of one or more other users on the social network. Other types of sources of information are possible. In some cases, an author can be treated as two or more sources depending on the medium the author uses to publish their content. For example, an author by the name of John Simpson can be treated as one source when he publishes content on his website and as another source when he publishes content on his social networking account.

Graph 100 illustrates the documents that various sources publish over a time period beginning with time $t_0$ and ending with time $t_n$. In general, a document is content published by a source that can be retrieved from the Internet or another type of network. By way of illustration, social network user source 100a has published documents A1, A2, A3 and A4 (collectively 102), web page source 100b has published documents B1, B2, B3, B4, B5 and B6 (collectively 104), and RSS source 100c has published documents C1, C2, C3, C4, C5 and C6 (collectively 106). A document's content can include text, images, sounds, video, formatting information, other multimedia content, computer program instructions (e.g., Javascript), or one or more combinations of these. By way of illustration, a document can be a webpage (or a portion thereof), a blog entry, a post in a social network, an email message, or an image. Documents can have various formats such as hypertext markup language (HTML), web feed or news feed formats such as rich site summary (RSS), or one or more combinations of these. Other document formats are possible. Documents can be published through websites, newsfeeds, social networks, or email, for example.

The interaction of users with the documents published by a given source provides a basis for determining what topics the source is good for. (This is described further below in reference to FIG. 2.) Such interaction can be, for example, user selection (e.g., with a mouse "click", a finger touch on a touch-sensitive display, or a voice command) or non-selection of a search result that identifies a document published by a given author where the search result was provided by a search engine in response to a query. Likewise, in the case of electronic email or social network posts, user interaction can include selection or non-selection of the email or post in order to perform an action on it such as expanding it in order to read it, replying to it, endorsing it, or commenting on it. Other types of user interaction are possible.

In this illustration, interaction of users with documents published by sources 100a, 100b and 100c during time period $t_0$ to $t_k$ is analyzed. After analyzing users' interactions with documents A1, A2 and A3 published by the source 100a during time period $t_0$ to $t_k$, it is determined that the topics for the source 100a are "bird species" and "wine" 108. That is, author 100a is produces high quality content for these topics 108. Likewise, after analyzing users' interactions with documents B1, B2, B3 and B4 published by the source 100b during time period $t_0$ to $t_k$, it is determined that the topic for the source 100b is "search engine optimization" 110. That is, the author 100b is produces high quality content when this is the topic. Finally, after analyzing users' interactions with documents C1, C2, C3 and C4 published by the source 100c during time period $t_0$ to $t_k$, it is determined that the topics for source 100c are "golf" and "baseball" 112.

Once a source's topics are identified, new documents published by the source pertaining to the same topics can be assumed to be of high quality even though there may be little or no user interaction data collected for the documents. In some examples, a new document is a document published or updated by a source within a recent time period (e.g., within the most recent ten days). Referring again to graph 100, a recent time period is the time period from $t_k$ to $t_n$. During the recent time period, little or no user interaction data has been collected for documents A4, B5, B6, C5 and C6. However, since topics for sources of these documents have already been established, it can be assumed that if the documents pertain to topics associated with their sources, the document are of high quality.

For example, if a topic of the content of document A4 is either bird species or wine ratings, it is assumed that the document is of high quality. Therefore, the document can be given a higher rank as a search result, for example. Similarly, if documents B5 and B6 concern search engine optimization, they are assumed to be of high quality. Finally, if documents C5 and C6 concern golf or baseball, they are also assumed to be of high quality.

Figure 2:
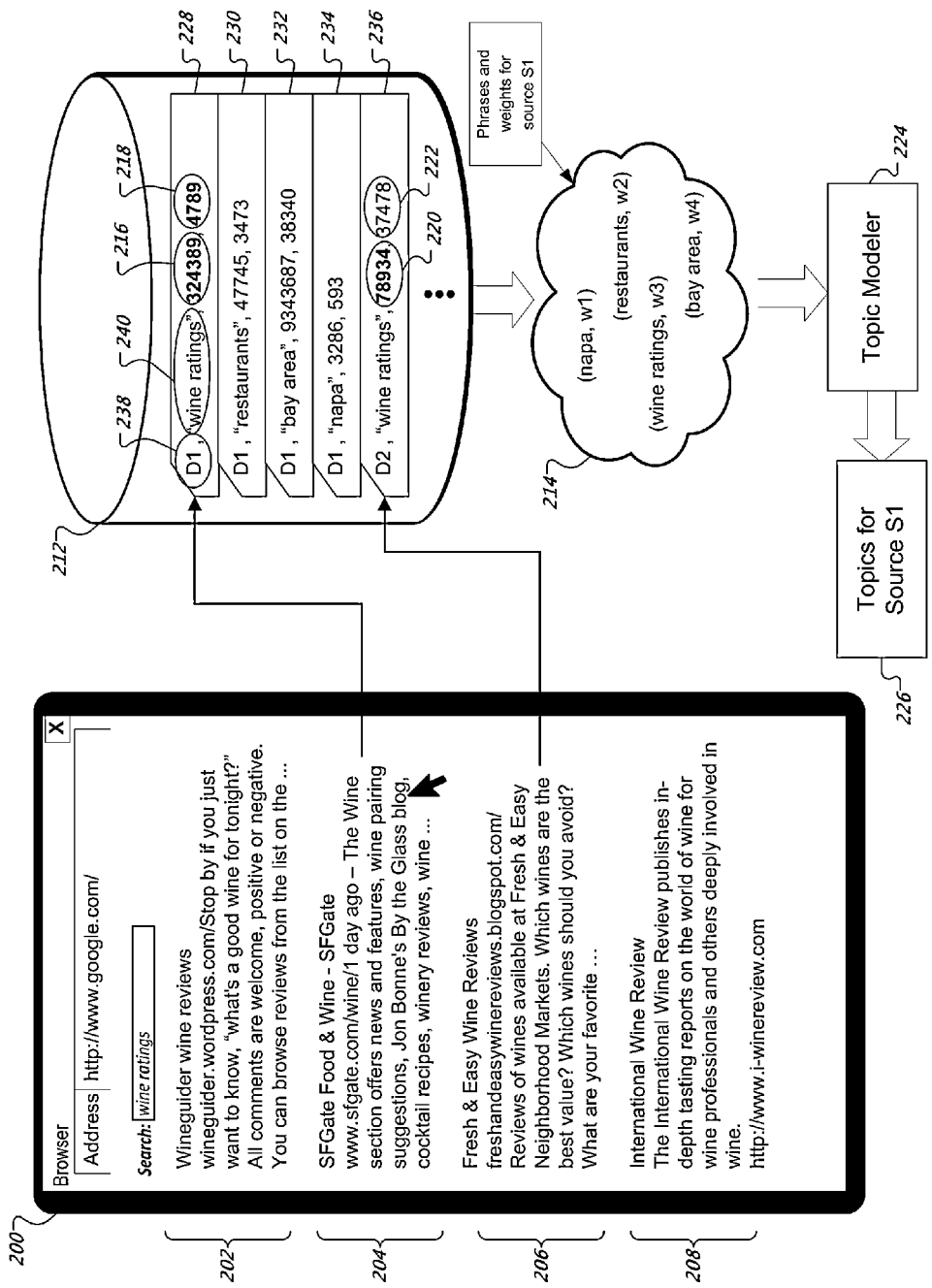
FIG. 2 illustrates how user interaction data is collected and used to identify topics for sources.

FIG. 2 illustrates how user interaction data for documents is collected and used to identify topics for sources. User interaction data results from use of services such as search engine services, email services, social networks services, and news feed services, for example, to interact with documents published by sources. (Other services are possible.) In some implementations, user interaction data may not be tethered to individual users' identities. In some implementations, user interaction data is analyzed in the aggregate. User interaction data is collected for document-text pairs and is updated over time as users interact with the documents. For a given document, there can be one or more document-text pairs, each having different text. The text of a document-text pair varies depending on the service through which the document of the document-text pair was identified. Selection of the text of a document-text pair based on a respective service is discussed further below.

For a document referred to by a search engine result provided by a search engine service, the text in the document-text pair is the query (or a portion thereof) for which the search engine result was responsive, a high inverse document frequency (IDF) term in the document, a high term frequency and inverse document frequency (TF-IDF) term in the document, or a snippet of text (or portion thereof) used to summarize the document in the search result. A snippet is a portion or portions of a document's content or a text summary of a document's content. IDF is a measure of whether a term is common or rare across all documents and can be obtained by dividing the total number of documents by the number of documents containing the term, and then taking the logarithm of that quotient. TF-IDF is a numerical statistic which reflects how important a word is to a document in a collection or corpus and is the product of two statistics, term frequency and IDF. Various ways for determining the exact values of both statistics exist. In some cases, the term frequency is the raw frequency of a term in a document, i.e. the number of times that term t occurs in document d.

For documents provided by social network services (e.g., social network posts), email services (e.g., email messages), or news feed services (e.g., news feed articles), the text in a document-text pair is a high IDF or TF-IDF term in the document, a snippet of text (or portion thereof) used to summarize the document in a respective user interface or, if a user is filtering documents to only show those having content pertaining to a particular topic, the text in the document-text pair can be the particular topic.

A data store 212 can be used for collecting user interaction data for each document-text pair from the various services through which the document is identified. The data store 212 can be implemented using one or more storage devices (e.g., flash memory, hard drives, and so on) controlled by one or more data processing apparatus. By way of illustration, data store 212 contains document-text pair records 228, 230, 232, 234 and 236. Records 228-234 are document-text pairs for document D1 and record 236 is a document-text pair for document D2.

Each document-text pair record contains a number of fields for storing information: a document identifier 238, text field 240, an impression count 216 and a selection count 218. The document identifier 238 is a URL or other reference to the document of the document-text pair. The text field 240 contains the text (or a reference to the text) of the document-text pair. The impression count 216 is a count of a number of times a snippet for the document of the document-text pair has been presented to users when the text of the document-query pair matches that selected for the service, whether or not the users chose to view the document. For example, an impression is counted for a document each time the document of a document-text pair is referred to by a search result, social network post snippet, email message snippet, or news feed snippet that is viewed by a user when the text of the document-query pair matches that selected for the service. The selection count 218 is a count of a number of times a snippet for the document of a document-text pair has been selected by users when the text of the document-text pair matches that selected for the service. For example, selection can include a mouse "click", a finger touch, or a voice command selecting a search result, social network post, email message, or a news feed article. Selection can also include endorsing, expanding (in order to view), rating, or commenting on a social network post, email message, or news feed article.

The document-text pair record 228 contains a reference to document D1, the text "wine ratings", the impression count 324389, and the selection count 4789. The document-text pair record 230 contains a reference to document D1, the text "restaurants", the impression count 47745, and the selection count 3473. The document-text pair record 232 contains a reference to document D1, the text "bay area", the impression count 9343687, and the selection count 38340. The document-text pair record 234 contains a reference to document D1, the text "napa", the impression count 3286, and the selection count 593. Finally, document-text pair record 236 contains a reference to the document D2, the text "wine ratings", the impression count 78934, and the selection count 37478.

In some implementations, multiple selection counts can be provided for each document-text pair wherein each selection count is a count of selections for a particular dwell or viewing time range. For example, if a user selects a search result and then views the document identified by the search result for a period of time, the period of time determines which selection count is incremented. If there are three selection counts, for instance, one count for times that are 30 seconds or less, another count for times between 30 seconds and 60 seconds, and a third for times that are greater than 60 seconds, one of the three will be incremented depending on the dwell time of the user.

Returning to FIG. 2, an example graphical user interface 200 presents search results 202, 204, 206 and 208 responsive to the query "wine ratings" as might be provided by an Internet search engine service, for example. The user interface 200 can be implemented using a web browser or other software application. However, the user interface 200 could also present social network posts, email messages, news feed articles, and so on. In this example, search result 204 refers to document (e.g., web page) D1 and search result 206 refers to document D2. The impression count 216 for the document-text pair record 228 is incremented since the search result 204 refers the document D1 in the text context of "wine ratings". If the user selects the search result 204, then the selection count 218 for the document-text pair record 228 is also incremented. The impression count 220 for the document-text pair record 236 is incremented since the search result 208 refers to the document D2 in the context of the query "wine ratings" because "wine ratings" is selected for the document D2 in the context of the search engine service. However, the selection count 222 for the record 236 is not incremented since the user does not select search result 208. The other document-text pair records 230, 232, and 234 for document D1 are not updated since the texts of those records does not match the query "wine ratings". In this way, document-text pair records are created and updated over time to reflect the user interaction of different users with documents referred to by the records.

The data store 212 can store document-text records for documents published by different sources. When enough user interaction data has been collected for a given source, the source's document-text pair records can be analyzed. That is, the document-text pair records that refer to a document published by a given source are analyzed in order to generate a set of texts and associated weights for the source. In some implementations, only those document-text pair records that contain a sufficient amount of user feedback data are analyzed. In some implementations, a statistical model for predicting when enough user interaction data has been collected for a given source is built. If the statistical confidence of the model exceeds a threshold, then the user interaction data is sufficient. In some implementations, user interaction data for a given document must originate from more than one user and more than one Internet Protocol subnet.

The text of each document-text pair record for a given source is associate a weight derived from the user interaction data of the record. In some implementations, the weight is the ratio of the selection count to the impression count. Other weights are possible. In some implementations, the weight is calculated as follows:

$$\frac{C+a}{I+b}$$

where C is the selection count, I is the impression count, and a and b are constants that can be a function of a combination of other site/page level signals.

In further implementations where multiple selection counts are maintained for the document-text pair record, only one of the selection counts is used. For example, only selections that are counted for dwell times that greater than or equal to a threshold number of seconds (e.g., 60 seconds) calculate the ratio. Because the same text can be associated with more than one document published by a given source, the user interaction data associated with document-text pairs having the same text can be aggregated. For example, if two document-text pair records contain the same text for different documents published by the same source, the weight calculated for the text can be the ratio of the sum of selection counts for the records to the sum of impression counts for the records.

By way of illustration, assuming that documents D1 and D2 were published by source S1, then the records 228-236 are used to derive the set of texts and associated weights 214 for the source S1: weight w1 for "napa" is $$\frac{593}{3286} = 0.18,$$

weight w2 for "restaurants" is $$\frac{3473}{47745} = 0.73,$$

weight w3 for "wine ratings" is $$\frac{4789 + 37478}{324389 + 78934} = 0.10,$$

and weight w4 for "bay area" is $$\frac{38340}{9343687} = 0.0041.$$

The texts and associated weights 214 are provided to a topic modeler 224. The topic modeler 224 can use well known techniques for determining one or more topics 226 that apply to the source S1 given the input 214 such as, for example, latent semantic analysis, probabilistic latent semantic analysis, or latent Dirichlet allocation. Other ways of determining topics from the set of texts and associated weights 214 are possible. Generally speaking, a topic is a person, a place, a thing or a concept. The weights can be adjusted to accommodate the peculiarities of the particular topic modeler 224. For example, the weights can be converted to negative numbers or normalized. Normalization can be used to limit the total of weights associated with a source or a document. Or normalization can ensure that each topic will have a distribution of sources. The topics 226 that are determined by the topic modeler 224 are considered the topics for which the source S1 produces high quality content.

The output of the topic modeler 224 can be used in various ways. For example, an application programming interface (API) can be implemented that includes functionality for obtaining the topics (e.g., topics 226) for a particular source and for determining what sources publish high-quality documents for a given topic. The output of the topic modeler 224 can also be used to match the interests of users (e.g., users of a social network a or search engine) with sources that provide high-quality content that matches the interests. As another example, search results that refer to new documents can be ranked higher than they would ordinarily if the documents pertain to topics that their sources produce high quality content for.

Figure 3:
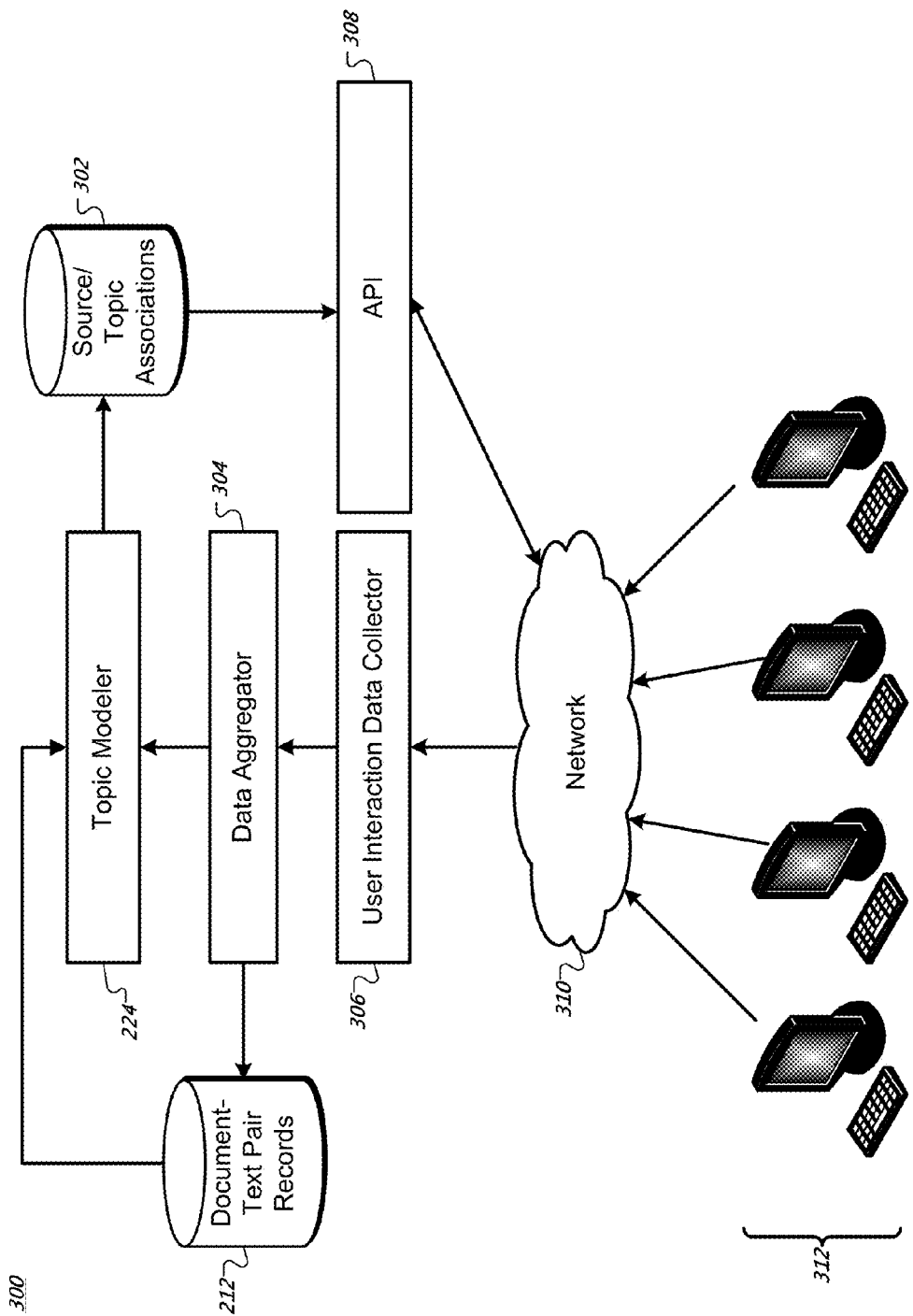
FIG. 3 illustrates an example system including one or more data processing apparatus.

FIG. 3 illustrates an example system 300 including one or more data processing apparatus. The system 300 is an example of a topic identification system in which systems, components, and techniques described herein can be implemented. Although the system is described in terms of separate components, the components can be combined or distributed in a number of different ways.

User interaction data is collected from user devices 312 (e.g., smart phones, tablet computers, laptop computers, personal computers, or game systems) through one or more data communication networks 310 (e.g., the Internet). In general, users of the user devices 312 interact with services such as search engines, social networks, email, and news readers, for example, and data characterizing their interaction is transmitted through the network 310 from the user devices 312 to the user interaction data collector 306 at appropriate times. The user interaction data collector 306 receives the data characterizing the user interactions and collects user interaction data for document-text pairs in the data store 212, as described above. The data aggregator 304 calculates respective weights for text associated with given sources, as described above. A topic modeler 224 obtains the text and associated weights for a source and determines one or more topics for which the source is considered to generate high-quality content. The topics and source associates are stored in a data store 302. The data store 302 can be accessed by an API 308 to provide functionality for identifying sources for a given topic or topics for a given source. The API 308 can be utilized by different services. Components 224, 304, 306 and 308 can be implemented in software and executed by one or more data processing apparatus.

Figure 4:
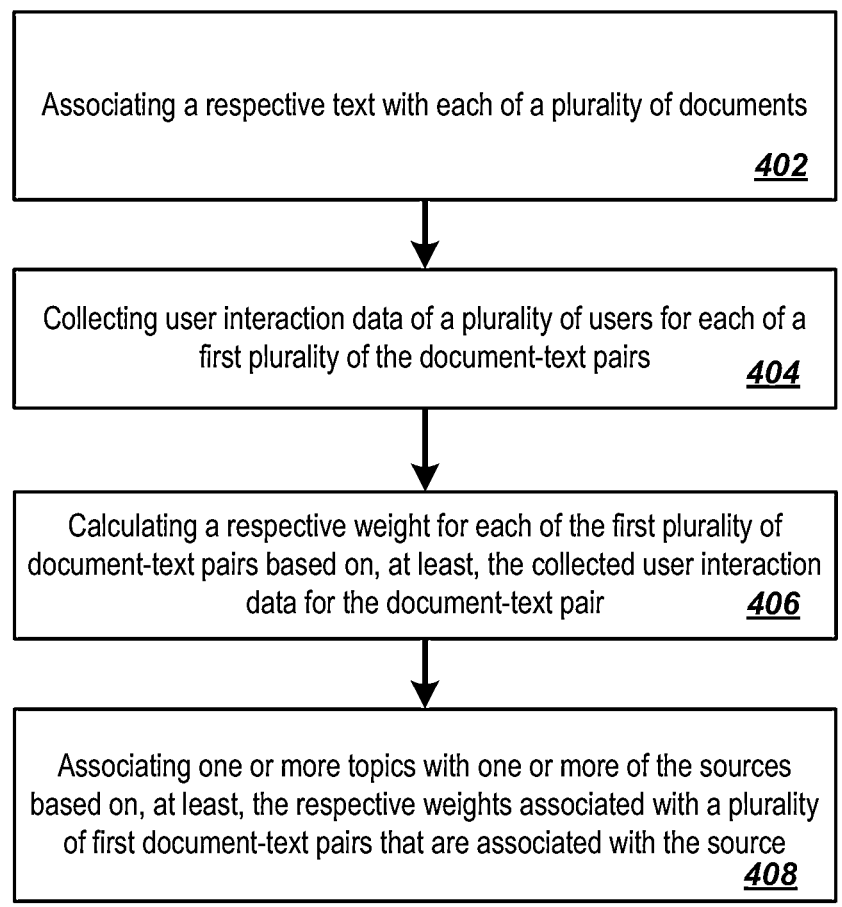

FIG. 4 is a flow diagram of an example process 400 for identifying one or more topics that a given source produces high quality content for. For convenience, the process 400 will be described as being performed by a system of one or more data processing apparatus located in one or more locations. For example, a system, e.g., system 300 of FIG. 3, can be used to perform the process 400.

The system (e.g., the system 300) associates a respective text with each of a plurality of documents wherein the respective text is selected based on, at least, a respective service through which the document was identified, and wherein the document and the respective text form a document-text pair (402). The user interaction data collector 306, for example, collects user interaction data of a plurality of users for each of a first plurality of the document-text pairs, wherein the user interaction data is collected for the document-text pair from the respective service for which the respective text of the document-text pair was selected (404). The data aggregator 304, for example, calculates a respective weight for each of the first plurality of document-text pairs based on, at least, the collected user interaction data for the document-text pair (406). And the topic modeler 224, for example, associates one or more topics with a source based on, at least, the respective weights associated with a plurality of first document-text pairs that are associated with the source and stores the association in data store 302 (408).

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. However, a computer readable medium is not a propagated signal. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A method implemented by data processing apparatus, the method comprising:
    associating a respective text with each of a plurality of documents wherein the respective text was selected based on, at least, a respective service through which the document was identified, and wherein the document and the respective text form a document-text pair;
    collecting user interaction data of a plurality of users for each of a first plurality of the document-text pairs, wherein the user interaction data is collected for the document-text pair from a respective service for which the respective text of the document-text pair is selected;
    calculating a respective weight for each of the first plurality of document-text pairs based on, at least, the collected user interaction data for the document-text pair; and
    associating one or more topics with a source based on, at least, the respective weights associated with a plurality of first document-text pairs that associated respective documents that were published by the source, wherein the source is an author or location on a network from which content can be obtained.

2. The method of claim 1 wherein the respective text of a particular document-text pair is a query for which one or more search results responsive to the query identified the particular document of the document-text pair.

3. The method of claim 2 wherein the collected user interaction data for the particular document-text pair is selections of the search results.

4. The method of claim 1 wherein the respective text of a particular document-text pair is one or more terms from the respective document of the document-text pair.

5. The method of claim 4 wherein the collected user interaction data for the particular document text pair is selections of social network posts, electronic email, or news feed posts that identify the particular document of the particular document-text pair.

6. The method of claim 5 wherein the one or more terms are high inverse document frequency or high term frequency and inverse document frequency terms in the respective document of the particular document-text pair.

7. The method of claim 1 wherein each respective service is a search engine, a social network, electronic mail system, or a news feed system.

8. The method of claim 1 wherein each topic refers to a person, a place, a thing, or a concept.

9. The method of claim 1, further comprising:
obtaining a plurality of search results responsive to a query, each of the search results identifying a respective document published by a respective source and having a respective score; and
for one or more of the search results, determining that the respective document identified by the search result pertains to a topic associated with the respective source of respective document and adjusting the respective score of the respective document in response to the determining.

10. A system comprising:
data processing apparatus programmed to perform operations comprising:
associating a respective text with each of a plurality of documents wherein the respective text was selected based on, at least, a respective service through which the document was identified, and wherein the document and the respective text form a document-text pair;
collecting user interaction data of a plurality of users for each of a first plurality of the document-text pairs, wherein the user interaction data is collected for the document-text pair from a respective service for which the respective text of the document-text pair is selected;
calculating a respective weight for each of the first plurality of document-text pairs based on, at least, the collected user interaction data for the document-text pair; and
associating one or more topics with a source based on, at least, the respective weights associated with a plurality of first document-text pairs that associated respective documents that were published by the source, wherein the source is an author or location on a network from which content can be obtained.

11. The system of claim 10 wherein the respective text of a particular document-text pair is a query for which one or more search results responsive to the query identified the particular document of the document-text pair.

12. The system of claim 11 wherein the collected user interaction data for the particular document-text pair is selections of the search results.

13. The system of claim 10 wherein the respective text of a particular document-text pair is one or more terms from the respective document of the document-text pair.

14. The system of claim 13 wherein the collected user interaction data for the particular document text pair is selections of social network posts, electronic email, or news feed posts that identify the particular document of the particular document-text pair.

15. The system of claim 13 wherein the one or more terms are high inverse document frequency or high term frequency and inverse document frequency terms in the respective document of the particular document-text pair.

16. The system of claim 10 wherein each respective service is a search engine, a social network, electronic mail system, or a news feed system.

17. The system of claim 10 wherein each topic refers to a person, a place, a thing, or a concept.

18. The system of claim 10, wherein the operations further comprise:
obtaining a plurality of search results responsive to a query, each of the search results identifying a respective document published by a respective source and having a respective score; and
for one or more of the search results, determining that the respective document identified by the search result pertains to a topic associated with the respective source of respective document and adjusting the respective score of the respective document in response to the determining.

19. A computer program product stored on a computer readable medium that, when executed by data processing apparatus, cause the data processing apparatus to perform operations comprising:
associating a respective text with each of a plurality of documents wherein the respective text was selected based on, at least, a respective service through which the document was identified, and wherein the document and the respective text form a document-text pair;
collecting user interaction data of a plurality of users for each of a first plurality of the document-text pairs, wherein the user interaction data is collected for the document-text pair from a respective service for which the respective text of the document-text pair is selected;
calculating a respective weight for each of the first plurality of document-text pairs based on, at least, the collected user interaction data for the document-text pair; and
associating one or more topics with a source based on, at least, the respective weights associated with a plurality of first document-text pairs that associated respective documents that were published by the source, wherein the source is an author or location on a network from which content can be obtained.

* * * * *